United States Patent
Rori et al.

(10) Patent No.: US 11,132,247 B2
(45) Date of Patent: Sep. 28, 2021

(54) SELECTIVE BAD BLOCK UNTAG AND BAD BLOCK REUSE

(71) Applicant: Micron Technology, Inc., Boise, ID (US)

(72) Inventors: Fulvio Rori, Boise, ID (US); Chiara Cerafogli, Boise, ID (US); Scott Anthony Stoller, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 101 days.

(21) Appl. No.: 16/049,439

(22) Filed: Jul. 30, 2018

(65) Prior Publication Data
US 2020/0034223 A1 Jan. 30, 2020

(51) Int. Cl.
*G06F 11/07* (2006.01)

(52) U.S. Cl.
CPC .......... *G06F 11/079* (2013.01); *G06F 11/073* (2013.01); *G06F 11/0751* (2013.01); *G06F 11/0787* (2013.01)

(58) Field of Classification Search
CPC ............... G06F 11/079; G06F 11/0751; G06F 11/0709; G06F 11/0787; G06F 11/0793
See application file for complete search history.

(56) References Cited

U.S. PATENT DOCUMENTS

| | | | | |
|---|---|---|---|---|
| 6,044,441 A * | 3/2000 | Malinowski | ........ | G06F 12/0802 711/144 |
| 8,316,283 B2 * | 11/2012 | Naeimi | ............ | H03M 13/2906 714/777 |
| 8,327,234 B2 * | 12/2012 | Earnshaw | ................ | H04L 1/20 714/780 |
| 8,386,833 B2 * | 2/2013 | Smith | ................ | G06F 13/1668 714/5.1 |
| 8,972,816 B2 * | 3/2015 | Ozturk | .................... | G11B 20/18 714/758 |
| 9,323,666 B2 * | 4/2016 | Danilak | ................. | G06F 3/0631 |
| 9,418,700 B2 * | 8/2016 | Ramanujan | ........ | G11B 20/1883 |
| 9,489,303 B2 * | 11/2016 | Danilak | ................. | G06F 3/0631 |
| 9,804,922 B2 * | 10/2017 | Kochar | .................... | G06F 12/08 |
| 2008/0082736 A1 * | 4/2008 | Chow | ................. | G06F 12/0246 711/103 |
| 2010/0064096 A1 * | 3/2010 | Weingarten | ......... | G06F 12/0246 711/103 |
| 2014/0115410 A1 * | 4/2014 | Kealy | .................... | G06F 11/00 714/704 |

\* cited by examiner

*Primary Examiner* — Amine Riad

(74) *Attorney, Agent, or Firm* — Schwegman Lundberg & Woessner, P.A.

(57) ABSTRACT

Aspects of the present disclosure include accessing block data stored in a memory component including memory blocks. The block data identifies bad blocks and reusable bad blocks, the reusable bad blocks having a higher level of reliability than bad blocks. Block selection is performed to select a block based on a block address. Based on the block selection and based on the block data, a tag operation is performed by setting a latch of the selected block to a first state in which access to the selected block is disabled.

21 Claims, 5 Drawing Sheets

SELECTIVE BAD BLOCK UNTAG AND BAD BLOCK REUSE

TECHNICAL FIELD

Embodiments of the disclosure relate generally to memory sub-systems, and more specifically, to selective bad block untag and bad block reuse.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory sub-systems of the memory system and to retrieve data stored from memory components.

BRIEF DESCRIPTION OF THE DRAWINGS

The present disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
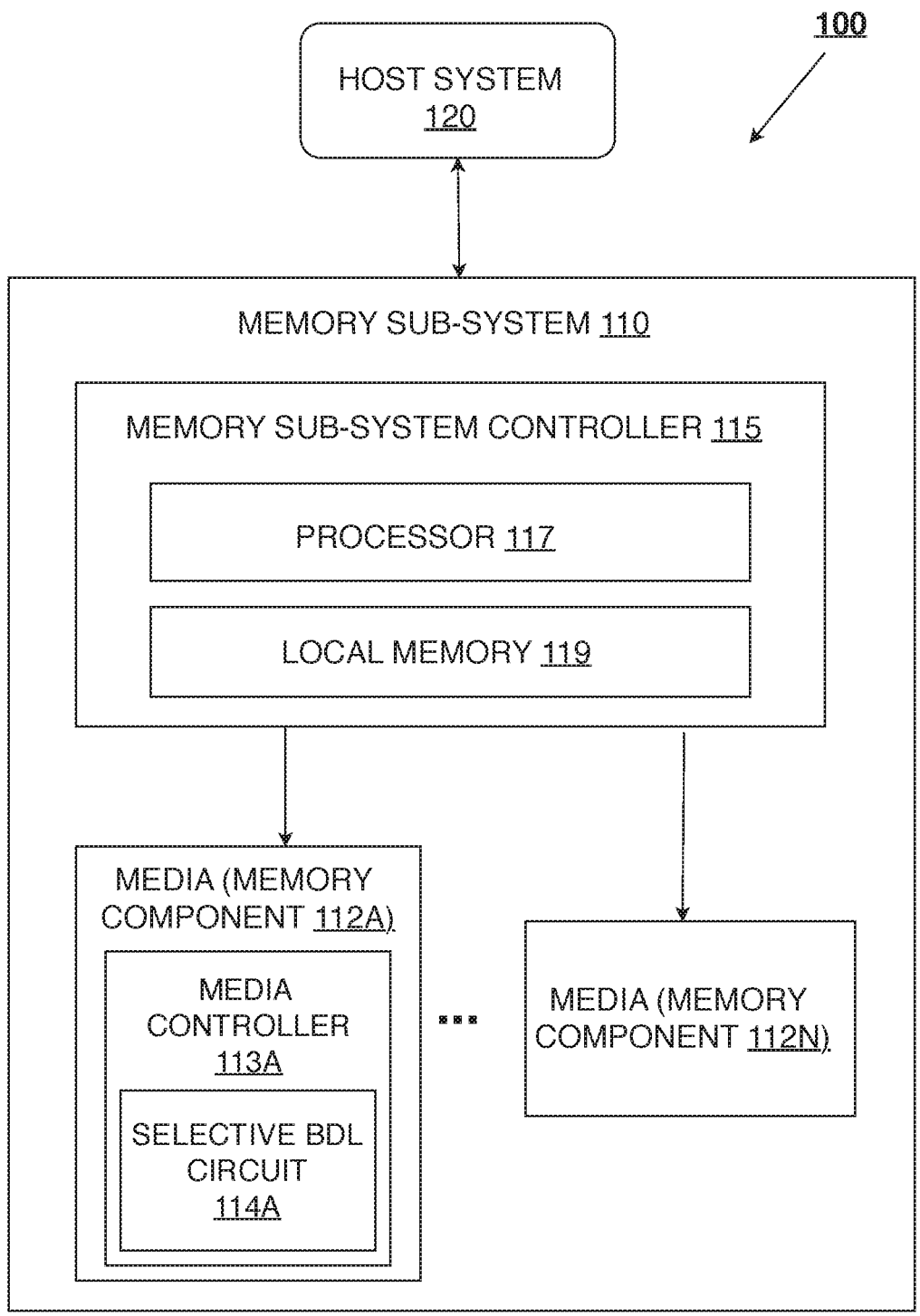
FIG. 1 is a block diagram for explaining an example computing environment including a memory system in accordance with some embodiments of the present disclosure.

Aspects of the present disclosure relate to performing a bad block tagging routine for a memory component. The bad block tagging routine disables access to bad blocks of memory that contain one or more invalid bits whose reliability is not guaranteed. Among the bad blocks, there is a subset of blocks having a relatively higher level of reliability than the remaining bad blocks (e.g., a lower level of defectiveness). In some aspects, the level of reliability of a block is based on a bit error rate of the block. In some aspects, the blocks in the subset are considered "reusable bad blocks" since it is acceptable for at least a portion of the data (e.g., metadata, noncrucial data) of each block to be used by the memory sub-system for numerous purposes, including error logging.

In some aspects, a selective block disable latch (BDL) circuit is provided that is operable to individually untag a single block. In some aspects, a single block of the reusable bad blocks is selectively untagged so it can be accessed and at least a portion of the data of the untagged block (e.g., metadata of the untagged block) can be used by the memory sub-system.

A memory sub-system is also hereinafter referred to as a "memory device". An example of a memory sub-system is a storage system, such as a solid-state drive (SSD). In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

A memory sub-system can include multiple memory components that can store data from the host system. The memory sub-system can further include a memory sub-system controller that can communicate with each memory component to perform operations such as reading data, writing data, or erasing data at the memory component in response to requests received from the host system. Any one or more of the memory components of the memory sub-system may include a media controller to manage memory blocks of the memory component, communicate with the memory sub-system controller, and execute memory requests (e.g., read or write) received from the memory sub-system controller.

The memory components can include any combination of the different types of non-volatile memory components and/or volatile memory components. An example of non-volatile memory components includes a negative-and (NAND) type flash memory. NAND flash memory is designed to serve as a low-cost solid-state mass storage medium. As a result, standard specifications for NAND flash memory allow a manufacturer to sell NAND flash devices having a percentage of non-functional blocks of memory, or "initial bad blocks" of memory. Allowing for bad blocks of memory increases the effective yield of marketable devices, thereby lowering costs. The bad blocks do not affect the performance of good blocks of memory because each block is independently accessible.

Bad blocks include blocks that contain one or more invalid bits whose reliability is not guaranteed. Bad blocks may be present when the device is shipped, or may develop during the lifetime of the device. Devices with bad blocks have the same quality level and the same AC and DC characteristics as devices where all the blocks are valid. A bad block does not affect the performance of valid blocks because it is isolated from the bit line and common source line by a select transistor. Bad block management, block replacement, and the error correction code (ECC) software are necessary to manage the error bits in NAND Flash devices.

NAND Flash devices are supplied with all the locations inside valid blocks erased (FFh). The bad block information is written prior to shipping.

For single-level cell (SLC) small page (528-byte/256-word page) devices, any block where the sixth byte (×8 device)/first word (×16 device) in the spare area of the first page does not contain FFh is a bad block. For SLC large page (2112-byte/1056-word page) devices, any block where the first and sixth bytes (×8 device)/first word (×16 device) in the spare area of the first page does not contain FFh is a bad block. For SLC very large page (4224-byte page) devices, any block where the first and sixth bytes in the spare area of the first page does not contain FFh is a bad block. For multilevel cell (MLC) devices, any block where the first byte in the spare area of the last page does not contain FFh is a bad block.

Generally, the process of identifying initial bad blocks occurs during testing by the manufacturer. A conventional manner of marking the bad blocks is to program non-FF data at specific locations within each bad block. Upon use, a bad block disable process is performed. The specific locations are queried to identify which blocks of memory are bad. Control logic included in the memory device identifies the bad blocks by checking for the non-FF data, and if present, the block can be disabled using a conventional technique of setting a latch in the respective block decoder circuits for the bad block (e.g., tagging the data block as "a bad block"). Setting the latch prevents access to the bad block and provides a hardware mechanism for disabling bad blocks prior to operation. The latch can be reset in the respective block decoder circuit such that the data block may again be accessed.

Usually, the conventional manner of tagging a bad block is selective, such that a single data block can be identified and tagged as a bad block. On the other hand, the conventional manner of untagging a bad block (e.g., resetting the latch) does not typically operate individually on a single data block, such that all of the data blocks in a memory component are cleared in a single operation.

Aspects of the present disclosure address the above and other deficiencies by configuring a media controller of a memory component to selectively untag a single block. In some aspects, the single block is a reusable bad block having a high level of reliability (e.g., a low level of defectiveness). Untagging such a single block allows for access by the memory sub-system to the block such that metadata of the untagged block can be used by the memory sub-system.

In this way, the conventional media controller can be replaced with the media controller disclosed herein which selectively performs both the tagging and untagging processes. It is therefore possible to individually untag a single reusable bad block in order to use at least a portion of its data (e.g., metadata, noncrucial data) for numerous purposes, including error logging.

FIG. 1 illustrates an example computing environment 100 including a memory sub-system 110, in accordance with some examples of the present disclosure. The memory sub-system 110 can include media, such as memory components 112A to 112N. The memory components 112A to 112N can be volatile memory devices, non-volatile memory devices, or a combination of such. In some embodiments, the memory sub-system 110 is a storage system. An example of a storage system is an SSD. In some embodiments, the memory sub-system 110 is a hybrid memory/storage system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory sub-system controller 115 (hereinafter referred to as "controller") can communicate with the memory components 112A to 112N to perform operations such as reading data, writing data, or erasing data at the memory components 112A to 112N and other such operations. The memory sub-system controller 115 can include hardware such as one or more integrated circuits and/or discrete components, a buffer memory, or a combination thereof. The memory sub-system controller 115 can be a microcontroller, special purpose logic circuitry (e.g., a field programmable gate array (FPGA), an application specific integrated circuit (ASIC), etc.), or other suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory components 112A to 112N. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The memory sub-system controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory components 112A to 112N.

Any one of the memory components 112A to 112N can include a media controller (e.g., media controller 113A) to manage the memory cells of the memory component, to communicate with the memory sub-system controller 115, and to execute memory requests (e.g., read or write) received from the memory sub-system controller 115.

In some aspects, the media controller 113A includes a selective block disable latch (BDL) circuit 114A constructed to selectively tag and untag a bad block (e.g., by setting a latch in one of a first state and a second state). In some aspects, the BDL circuit 114A performs an untagging process on a reusable bad block determined to have a higher level of reliability than the remaining bad blocks (e.g., a low level of defectiveness) to allow access to the untagged block such that at least a portion of the data (e.g., metadata) of the untagged block can be used by the memory sub-system.

Figure 2:
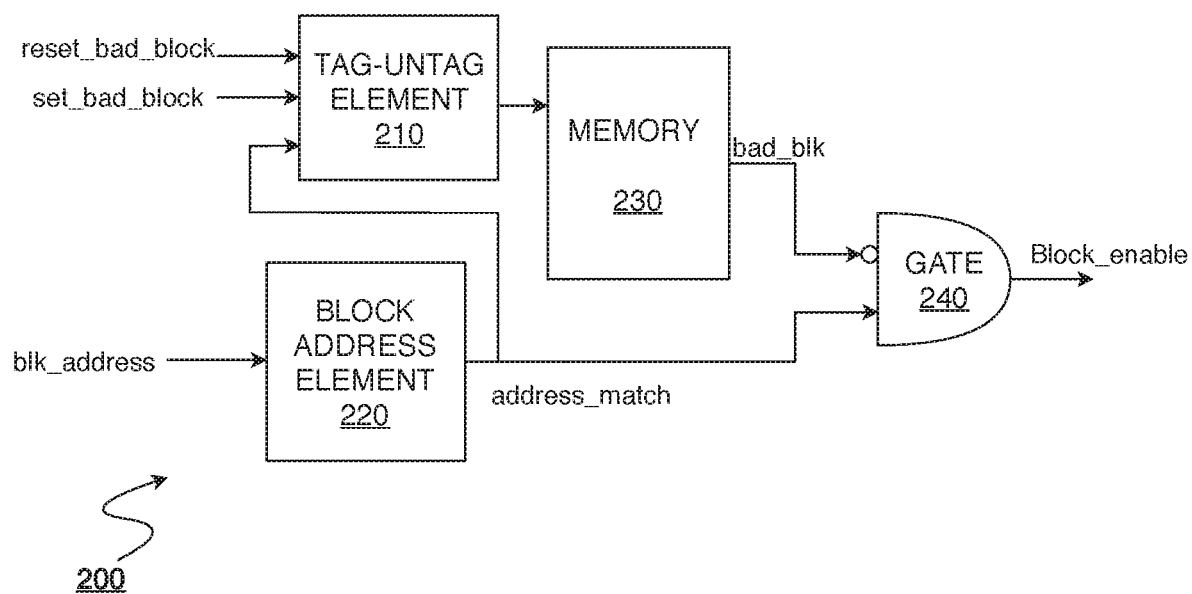
FIG. 2 is a block diagram for explaining an example block disable latch (BDL) circuit included in a media controller in accordance with some embodiments of the present disclosure.

One example of a BDL circuit 114A included in the media controller 113A is discussed using block diagram 200 illustrated in FIG. 2. In the embodiment of FIG. 2, one example of a selective BDL circuit is illustrated by circuit 200 including tag-untag element 210, block address element 220, memory 230, and gate 240.

In some embodiments, tag-untag element 210 performs block tagging and untagging (e.g., a bad block tagging routine) based on a block address. For example, as shown in FIG. 2, signals "reset_bad_block" and "set_bad_block" are input to tag-untag element 210. These inputs are global signals common for all blocks. Also input to tag-untag element 210 is an "address_match" signal output from block address element 220 based on a block address indicated by a "blk_address" signal. In some embodiments, block address element 220 performs block selection based on the block address, such that a single block may be addressed. In some embodiments, block address element 220 compares a block address for selecting at least one memory block of the memory blocks with a bad block address list stored in memory 230 and outputs the "address_match" signal indicating whether the block address matches the bad block address list. In some embodiments, the match signal and the block address are decoded and a plurality of block selection signals are generated.

Based on the block address obtained from block address element 220 and the "reset_bad_block" and "set_bad_block" signals, tag-untag element 210 either sets a latch indicating that a particular block is bad (and is therefore not accessible) or resets the latch to indicate that the block is not bad (and is therefore accessible).

Thus, as shown in FIG. 2, both "reset_bad_block" and "set_bad_block" signals are conditioned by the block address selected by block address element 220. Accordingly, in response to the "reset_bad_block" signal being asserted, only the latch of the block indicated by the block address is reset. It is therefore possible for tag-untag element 210 to selectively untag a single block. In contrast, in a conventional memory system, the "reset_bad_block" signal is not typically conditioned by the block address, such that when the "reset_bad_block" signal is asserted in a conventional memory system, all block latches are reset.

Tag-untag element 210 is coupled to memory 230. In some embodiments, based on the output of tag-untag element 210, memory 230 stores information or data indicating whether a block is a bad block (e.g., whether a latch for a block has been set to a first state). In some embodiments, memory 230 stores information or data indicating a level of reliability of a block (e.g., whether the block is a bad block or a reusable bad block). In some embodiments, memory 230 stores a bad block list having at least two parts, namely at least (1) a first part comprising a list of bad blocks (e.g., a bad block list) including blocks that have been determined to have a first level of reliability and (2) a second part comprising a list of reusable bad blocks (e.g., a reusable bad block list) including blocks that have been determined to have a second level of reliability higher than the first level.

In some embodiments, memory 230 stores a bad block table including data indicating whether a block is a bad block. In some embodiments, the bad block table stores information or data indicating a level of reliability of a block (e.g., whether the block is a bad block or a reusable bad block). In some embodiments, the bad block table is created by reading all the spare areas in the NAND Flash memory. The bad block recognition methods that build the bad block table without using the original bad block information provided in the spare areas of the memory are not equally effective. The invalid blocks are detected at the factory during the testing process, which involves severe environmental conditions and PROGRAM/ERASE cycles as well as proprietary test modes. The failures that affect invalid blocks may not all be recognized if methods different from those implemented in the factory are used. Once created, the bad block table is saved to a good block so that on rebooting the NAND Flash memory the bad block table is loaded into RAM. The blocks contained in the bad block table are not addressable. So, if the flash translation layer (FTL)

addresses one of the bad blocks, the bad block management software redirects it to a good block.

In some embodiments, the level of reliability of a block is based on a bit error rate of the block. In some embodiments, a first threshold for a level of reliability for a bad block is set during testing by a manufacturer. For example, a manufacturer can set a first threshold for a bit error rate such that any block having a bit error rate lower than the first threshold is considered to be a bad block and is added to the bad block list. In some embodiments, a second threshold for a level of reliability for a reusable bad block is set during testing by the manufacturer. For example, the second threshold can be set such that any bad block (e.g., block having a bit error rate lower than the first threshold) having a bit error rate higher than the second threshold is considered to be a reusable bad block and is added to the reusable bad block list.

Memory 230 outputs a "bad_blk" signal indicating whether the latch has been set for a particular block. In some embodiments, the "bad_blk" signal is set to a value of "0" if the latch is set to the first state indicating the block is a bad block. The "bad_blk" signal is inverted and provided to gate 240, along with the "address_match" signal output from block address element 220. In some embodiments, gate 240 comprises AND logic as is known in the art. If the block address matches and the inverted "bad_blk" signal indicates that the latch is not set, gate 240 outputs "Block_enable" signal to enable the addressed block. In some embodiments, enabling the selected block involves resetting the latch such that the block indicated by the block address becomes accessible and at least a portion of its data can be used.

In some embodiments, to enable all blocks at once (e.g., to reset all latches during initialization), all of the blocks are addressed together by block address element 220.

Figure 3:
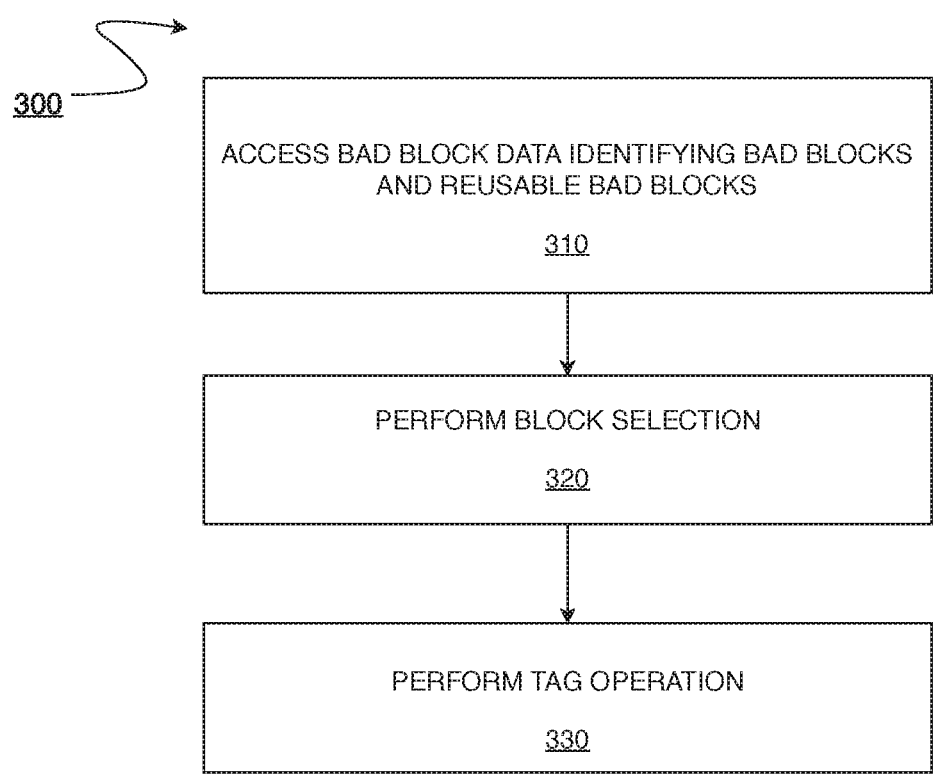
FIG. 3 is a flow diagram for explaining an example method for block disable latch (BDL) initialization in accordance with some embodiments of the present disclosure.

FIG. 3 is a flow diagram of an example method 300 to perform block disable latch (BDL) initialization in accordance with some embodiments of the present disclosure. In some embodiments, BDL initialization is performed during a "power-on" phase of the media component.

At operation 310, bad block data is accessed. The bad block data is stored in a memory, such as memory 230, and indicates whether a block is a bad block or a reusable bad block. As previously discussed in connection with FIG. 2, in some embodiments, the bad block data includes a bad block list and a reusable bad block list. The reusable bad block list includes blocks having a higher level of reliability than blocks included in the bad block list, such that it is acceptable for the memory system to use at least a portion of the data stored in such blocks (e.g., metadata, noncrucial data). In contrast, in a conventional manner of tagging a bad block, the bad block list does not typically indicate a subset of blocks that are reusable.

At operation 320, block selection is performed by block address element 220 to select a block based on a block address. At operation 330, tag-untag element 210 performs a tag operation based on the block selection at operation 320 and the bad block data accessed at operation 310 by setting a latch to a first state in which access to the selected block is disabled. For example, if the block selected at operation 320 is indicated as a bad block by the bad block data accessed at operation 310, the tag operation is performed at operation 330, disabling access to the selected block. On the other hand, if the block selected at operation 320 is not indicated as a bad block by the bad block data accessed at operation 310, the tag operation is not performed at operation 330 access to the selected block is not disabled.

Operations 310-330 are performed until all of the blocks included in the bad block list are traversed.

Although not shown in the flow diagram of FIG. 3, in some embodiments, before the bad block list is accessed at operation 310, block disable latches are cleared for all blocks in the memory array. For example, all blocks in the memory array are selected by block address element 220, and tag-untag element 210 resets all the latches to a second state in which access to the blocks is enabled. Thus, by addressing all of the blocks together, all latches can be reset during initialization of the media component such that all of the blocks in the memory array are enabled.

The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the media controller 113A of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 4:
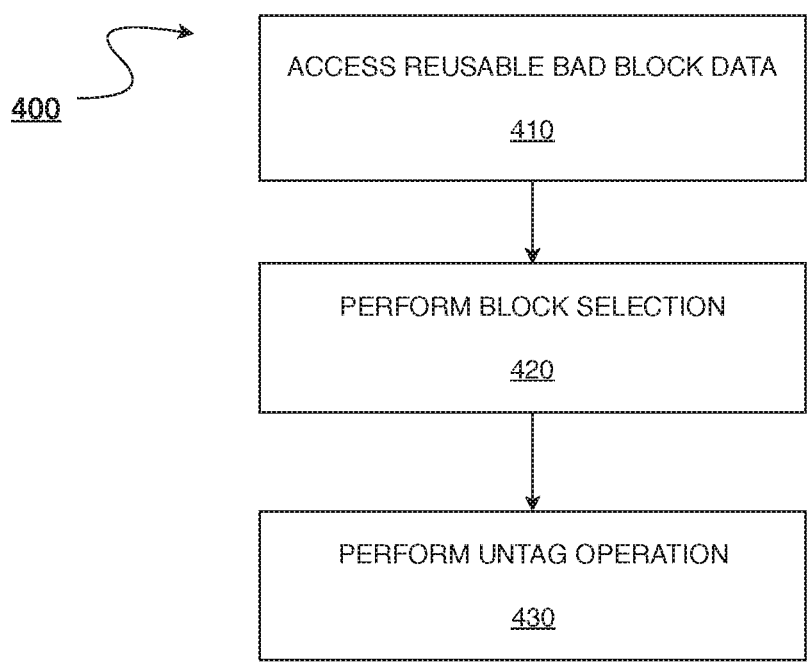
FIG. 4 is a flow diagram for explaining a method to selectively untag a single block in accordance with some embodiments of the present disclosure.

FIG. 4 is a flow diagram of an example method 400 to perform a selective untagging process on a single block in accordance with some embodiments of the present disclosure. In some embodiments, the selective untagging process is performed after initialization of the media component. After the block is untagged, at least a portion of its data can be used by memory sub-system for numerous purposes, including error logging.

At operation 410, block data identifying the reusable bad blocks (e.g., the reusable bad block list stored in memory 230) is accessed. At operation 420, block selection is performed by block address element 220 to select a block based on a block address. At operation 430, based on the block selection and the reusable bad block data, an untag operation is performed by setting a latch of the selected block to a second state in which access to the selected block is enabled. For example, if the block selected at operation 420 is indicated as a reusable bad block by the bad block list accessed at operation 410, the untag operation is performed at operation 430, enabling access to the selected block. In this way, it is possible to individually untag each of the reusable bad blocks to allow for use of its metadata by the memory sub-system. On the other hand, if the block selected at operation 420 is not indicated as a reusable bad block by the bad block data accessed at operation 410, the untag operation is not performed at operation 430 and access to the selected block is not enabled.

The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the media controller 113A of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

EXAMPLES

Example 1 is a memory device, comprising: a memory component including a plurality of memory blocks; and a memory controller coupled to the memory component and operable to perform operations comprising: accessing block data stored in the memory component, the block data identifying bad blocks of the plurality of memory blocks and reusable bad blocks of the plurality of memory blocks, wherein the reusable bad blocks have a higher level of reliability than bad blocks; performing block selection, using block address logic, to select a block of the plurality of memory blocks based on a block address; and performing a tag operation by setting, using tagging logic, a latch of the selected block to a first state in which access to the selected block is disabled, based on the block selection and based on the block data.

In Example 2, the subject matter of Example 1 optionally includes the block data being comprised of a list of bad blocks and reusable bad blocks.

In Example 3, the subject matter of any one or more of Examples 1-2 can optionally include the level of reliability being based on bit error rate of the block.

In Example 4, the subject matter of any one or more of Examples 1-3 can optionally include a threshold for the level of reliability being set during testing by a manufacturer.

In Example 5, the subject matter of any one or more of Examples 1-4 can optionally include a first threshold for a target level of reliability being set, and in a case where the selected block has a bit error rate lower than the first threshold, the selected block is considered a bad block and is added to the bad block list.

In Example 6, the subject matter of any one or more of Examples 1-5 can optionally include a second threshold for the lower level of reliability being set, and in a case where the bad block has a bit error rate higher than the second threshold, the selected block is considered a reusable bad block and is added to the reusable bad block list.

In Example 7, the subject matter of any one or more of Examples 1-6 can optionally include the tag operation being performed during initialization of a non-volatile memory.

In Example 8, the subject matter of any one or more of Examples 1-7 optionally includes the operation of, before the bad block data is accessed, selecting all of the plurality of memory blocks and resetting all the latches of the plurality of memory blocks to a second state so that access to the all of the plurality of memory blocks is enabled.

In Example 9, the subject matter of any one or more of Examples 1-8 optionally includes the operations of accessing the block data identifying the reusable bad blocks; and based on the block selection and the block data identifying the reusable bad blocks, performing an untag operation on the selected block by resetting a latch to a second state in which access to the selected block is enabled.

In Example 10, the subject matter of Example 9 optionally includes the untag operation being performed after initialization of a non-volatile memory.

In Example 11, the subject matter of any one or more of Examples 9-10 optionally includes metadata of the untagged block being used for error logging.

In Example 12, the subject matter of any one or more of Examples 1-11 optionally includes a non-volatile memory having a plurality of addressable regions.

Example 13 is a method comprising: accessing block data stored in a memory component including a plurality of memory blocks, the block data identifying bad blocks of the plurality of memory blocks and reusable bad blocks of the plurality of memory blocks, wherein the reusable bad blocks have a higher level of reliability than bad blocks; performing block selection, using block address logic, to select a block of the plurality of memory blocks based on a block address; and performing a tag operation by setting, using tagging logic, a latch of the selected block to a first state in which access to the selected block is disabled, based on the block selection and based on the block data.

In Example 14, the subject matter of Example 13 optionally includes the block data comprising a list of bad blocks and reusable bad blocks.

In Example 15, the subject matter of any one or more of Examples 13-14 optionally includes the level of reliability being based on bit error rate of the block.

In Example 16, the subject matter of any one or more of Examples 13-15 optionally includes a threshold for the level of reliability being set during testing by a manufacturer.

In Example 17, the subject matter of any one or more of Examples 13-16 optionally includes a first threshold for a target level of reliability being set, and in a case where the selected block has a bit error rate lower than the first threshold, the selected block is considered a bad block and is added to the bad block list.

In Example 18, the subject matter of any one or more of Examples 13-17 optionally includes a second threshold for the lower level of reliability being set, and in a case where the bad block has a bit error rate higher than the second threshold, the selected block is considered a reusable bad block and is added to the reusable bad block list.

In Example 19, the subject matter of any one or more of Examples 13-18 optionally includes the tag operation being performed during initialization of a non-volatile memory.

In Example 20, the subject matter of any one or more of Examples 13-19 optionally includes the operations of, before the bad block data is accessed, selecting all of the plurality of memory blocks and resetting all the latches of the plurality of memory blocks to a second state so that access to the all of the plurality of memory blocks is enabled.

In Example 21, the subject matter of any one or more of Examples 13-20 optionally includes the operations of accessing the block data identifying the reusable bad blocks; and based on the block selection and the block data identifying the reusable bad blocks, performing an untag operation on the selected block by setting a latch to a second state in which access to the selected block is enabled.

In Example 22, the subject matter of Example 21 optionally includes the untag operation being performed after initialization of a non-volatile memory.

In Example 23, the subject matter of any one or more of Examples 21-22 optionally includes using metadata of the untagged block for error logging.

Figure 5:
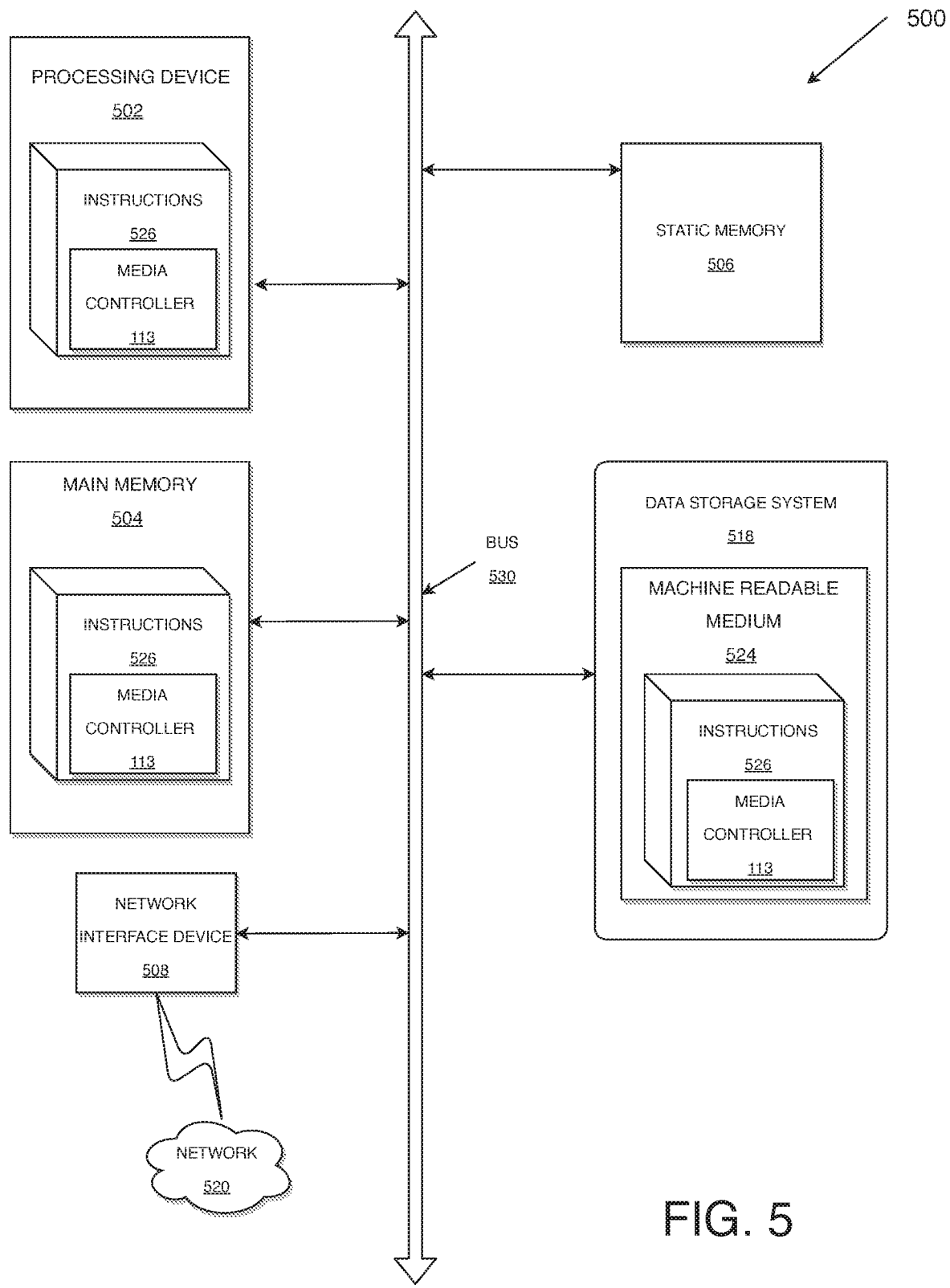
FIG. 5 is a block diagram for explaining an example computer system in which embodiments of the present disclosure may operate.

FIG. 5 illustrates an example machine of a computer system 500 within which a set of instructions can be executed for causing the machine to perform any one or more of the methodologies discussed herein. In some embodiments, the computer system 500 can correspond to a host system (e.g., the host system 120 of FIG. 1) that includes, is coupled to, or utilizes a memory sub-system (e.g., the memory sub-system 110 of FIG. 1), or can be used to perform the operations of a controller (e.g., to execute an operating system to perform operations corresponding to the data comparator(s) 122 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device 502 can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a data comparator (e.g., the data comparator(s) 122 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

The invention claimed is:

1. A memory device, comprising:
a memory component including a plurality of memory blocks; and
a memory controller coupled to the memory component and operable to perform operations comprising:
accessing bad block data stored in the memory component, the bad block data including a list of bad blocks of the plurality of memory blocks and a list of reusable bad blocks of the plurality of memory blocks, wherein the reusable bad blocks have a higher level of reliability than bad blocks, wherein each block in the list of bad blocks and the list of reusable bad blocks comprises at least one or more invalid bits;
performing block selection, using block address logic, to select a block of the plurality of memory blocks based on a block address; and
performing a tag operation by setting, using tagging logic, a latch of the selected block to a first state in which access to the selected block is disabled, based on the block selection and based on the bad block data.

2. The memory device of claim 1, wherein a level of reliability is based on a bit error rate of the block.

3. The memory device of claim 1, wherein a threshold for a level of reliability is set during testing by a manufacturer.

4. The memory device of claim 1, wherein a first threshold for a target level of reliability is set, and
wherein, in a case where the selected block has a bit error rate lower than the first threshold, the selected block is considered a bad block and is added to the bad block data.

5. The memory device of claim 4, wherein a second threshold for a lower level of reliability is set, and
wherein in a case where the bad block has a bit error rate higher than the second threshold, the selected block is considered a reusable bad block and is added to the bad block data.

6. The memory device of claim 1, wherein the tag operation is performed during initialisation of a non-volatile memory.

7. The memory device of claim 1, wherein before the bad block data is accessed, the memory controller is operable to perform further operations comprising:
selecting all of the plurality of memory blocks and resetting all latches of the plurality of memory blocks to a second state so that access to all of the plurality of memory blocks is enabled.

8. The memory device of claim 1, further comprising:
accessing the list of reusable bad blocks from the bad block data; and
based on the block selection and the list of reusable bad blocks, performing an untag operation on the selected block by resetting the latch to a second state in which access to the selected block is enabled.

9. The memory device of claim 8, wherein the untag operation is performed after initialization of a non-volatile memory.

10. The memory device of claim 8, wherein metadata of the untagged block is used for error logging.

11. The memory device of claim 1, wherein the memory device comprises a non-volatile memory having a plurality of addressable regions.

12. A method comprising:
accessing bad block data stored in a memory component including a plurality of memory blocks, the bad block data including a list of bad blocks of the plurality of memory blocks and a list of reusable bad blocks of the plurality of memory blocks, wherein the reusable bad blocks have a higher level of reliability than bad blocks, wherein each block in the list of bad blocks and the list of reusable bad blocks comprises at least one or more invalid bits;
performing block selection, using block address logic, to select a block of the plurality of memory blocks based on a block address; and
performing a tag operation by setting, using tagging logic, a latch of the selected block to a first state in which access to the selected block is disabled, based on the block selection and based on the bad block data.

13. The method of claim 12, wherein a level of reliability is based on a bit error rate of the block.

14. The method of claim 12, wherein a threshold for a level of reliability is set during testing by a manufacturer.

15. The method of claim 12, wherein a first threshold for a target level of reliability is set, and
wherein, in response to the selected block having a bit error rate lower than the first threshold the selected block is considered a bad block and is added to the bad block data.

16. The method of claim 15, wherein a second threshold for a lower level of reliability is set, and
wherein, in response to the bad block having a bit error rate higher than the second threshold, the selected block is considered a reusable bad block and is added to the bad block data.

17. The method of claim 12, wherein the tag operation is performed during initialization of a non-volatile memory.

18. The method of claim 12, further comprising:
before the bad block data is accessed,
selecting all of the plurality of memory blocks and resetting all latches of the plurality of memory blocks to a second state so that access to all of the plurality of memory blocks is enabled.

19. The method of claim 12, further comprising:
accessing the list of reusable bad blocks from the bad block data; and
based on the block selection and the list of reusable bad blocks, performing an untag operation on the selected block by setting the latch to a second state in which access to the selected block is enabled.

20. The method of claim 19, wherein the untag operation is performed after initialization of a non-volatile memory.

21. The method of claim 19, further comprising:
using metadata of the untagged block for error logging.

* * * * *